United States Patent [19]

Guez

[11] Patent Number: 4,827,291

[45] Date of Patent: May 2, 1989

[54] PHOTOGRAPHIC AID APPARATUS FOR PHOTOGRAPHING A UNIFORMLY ILLUMINATED OBJECT

[75] Inventor: Moshe Guez, Randolph, Mass.

[73] Assignee: Avner, Inc., Stoughton, Mass.

[21] Appl. No.: 939,908

[22] Filed: Dec. 9, 1986

[51] Int. Cl.⁴ .......................... G03B 15/06; G03B 1/00
[52] U.S. Cl. ...................................... 354/125; 354/126
[58] Field of Search ................ 354/122, 125, 126, 295

[56] References Cited

U.S. PATENT DOCUMENTS

| | | | |
|---|---|---|---|
| 2,186,610 | 1/1940 | Leavitt et al. | 354/122 |
| 2,989,907 | 6/1961 | Nelson | 354/125 |
| 3,124,050 | 3/1964 | Bay | 354/125 |
| 3,940,775 | 2/1976 | Bodnar | 354/122 |
| 4,012,748 | 3/1977 | Lemanski | 354/122 |
| 4,137,540 | 1/1979 | Curtis | 354/122 |
| 4,149,790 | 4/1979 | Smith | 354/125 |

*Primary Examiner*—A. A. Mathews
*Attorney, Agent, or Firm*—Darby & Darby

[57] ABSTRACT

Disclosed is a method for making superimposed photographs on the same frame of a roll of negative film, the photographs comprising a background and a foreground involving the following steps (a) first exposing a selected portion of a first frame of negative film with an image of one of the foreground and the background by shielding from exposure the remainder of the first frame with a first mask;

(b) making a series of first exposures by repeating step (a) advancing the film by one frame for each exposure;

(c) rewinding the film to the first frame;

(d) preventing reexposure of the exposed portion of the first frame by shielding the portion with a second mask;

(e) second-exposing the previously unexposed portion of the first frame with an image of the other of the foreground and the background;

(f) making a series of second exposures by repeating the step (e) while advancing the film for each exposure.

11 Claims, 7 Drawing Sheets

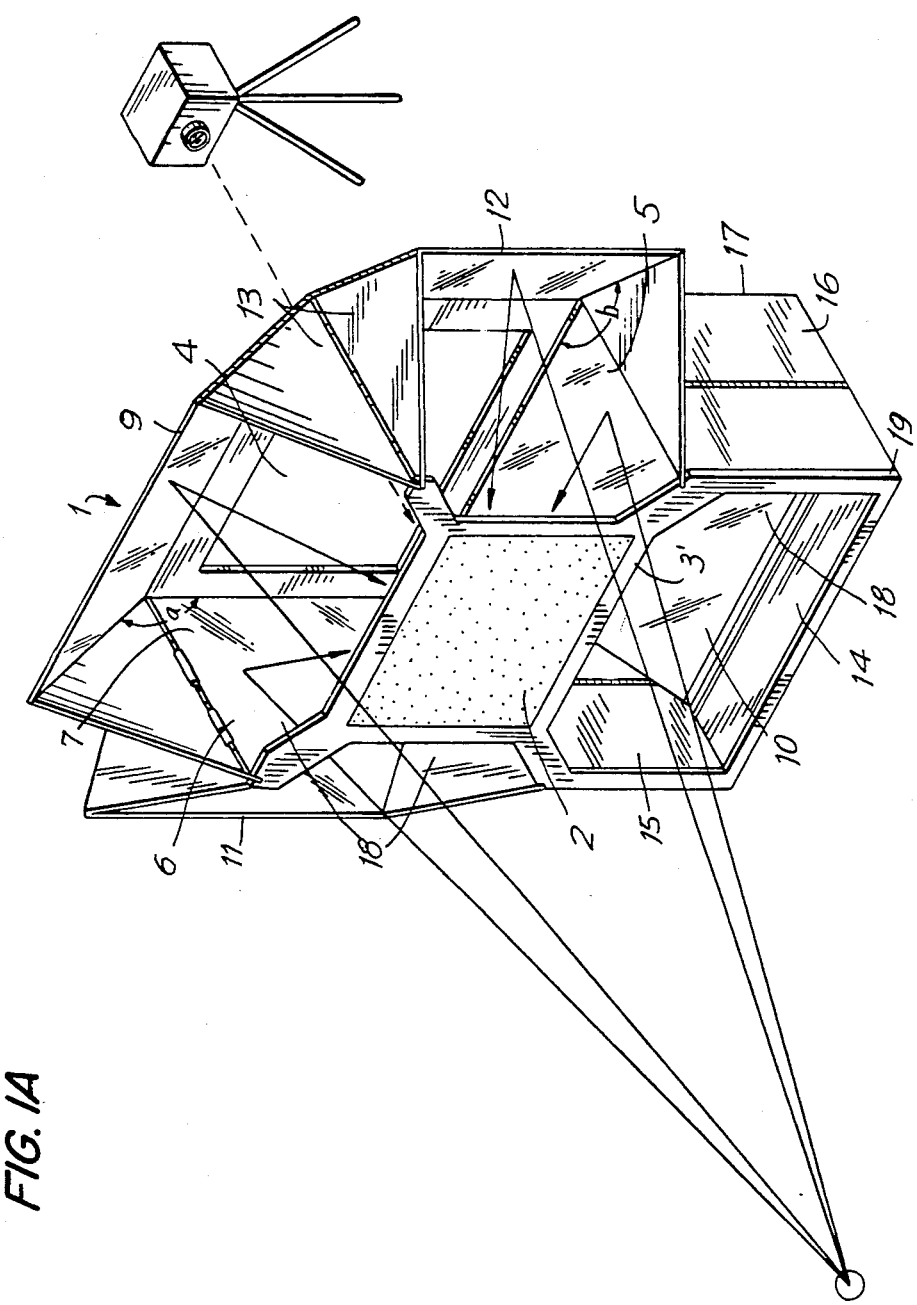
FIG. IA

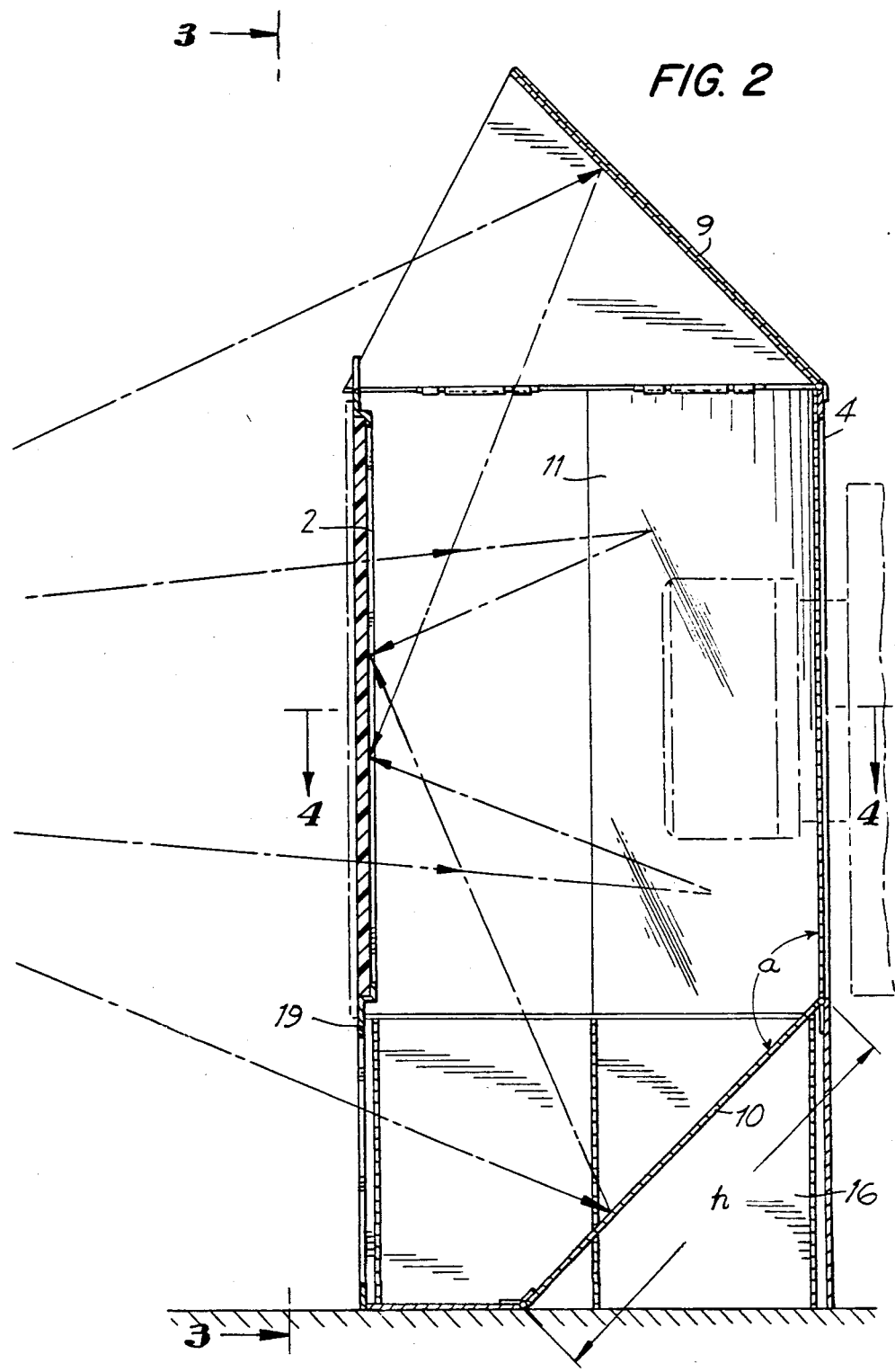

PHOTOGRAPHIC AID APPARATUS FOR PHOTOGRAPHING A UNIFORMLY ILLUMINATED OBJECT

FIELD OF THE INVENTION

The present invention relates to a method and apparatus for photographing objects under a uniform light and to products made using such method. The present invention also permits realizing superimposed photographic images on the same negative film (which can be still film, video or motion picture film) and is directed to such products.

In addition, the present invention lends itself to various other applications, for example, duplicating slides, creating superimposed images as a master for offset printing (so that only one image will be processed for separation into four colors), positive photograph reproductions, postage stamp reproductions, life photographs with different background and the like. Such photographs and images find wide use in advertising, offset printing, making greeting cards, business cards, identification cards, etc.

BACKGROUND OF THE INVENTION

Currently, superimposed pictures can be produced only in an expensive and cumbersome manner. Specifically, at least one cut negative film for one or more elements of the final composition is first exposed, with the element(s) to be photographed being cast against a black background (or using a special mask permitting only the element(s) to be "seen" by the lens). The black background will not cause exposure but will result in a transparent area on the exposed, developed negative. A second negative is similarly prepared for the background. The second negative also contains an unexposed portion corresponding to the exposed portion of the first negative(s). The two cut negatives are then superimposed in "sandwich contact" together with the positive substrate and the positive print is generated.

It is obvious that this is an expensive technique requiring use of cut film and involving at least two negatives, substantial manipulation of the negatives and a long processing which must be conducted manually. In addition, the cut negative films and the positive (final) print must be of the same size and in contact with each other for optimum results. Cut negative is professional film and therefore very expensive. Roll film cannot be used. Furthermore, the degree of exposure of the first negative and of the second negative should be identical for optimum results in the composite picture, and hence a substantial amount of skill in the photographic art is required.

In the field of photography, it is often desirable to have a uniform light field to illuminate the object to be photographed. This becomes more important when the object to be photographed is of small dimensions and has considerable detail that must be reproduced on the photograph (such as for example an electronic chip, a stamp and the like) or if the object to be photographed or reproduced is not flat and smooth but has surface abnormalities (such as an antique photograph or a photograph that has creases). In the prior art, such objects were illuminated directly with two or more lights cast from different directions and angles. Although this represented an improvement over the use of a single light source, a uniformly lit field was not achievable. Multiple light sources had to be used and umbrellas and/or reflectors were also used to soften the light and to make it more evenly distributed. In spite of these efforts, the light field was far from uniform. Also, the body of the photographer and the apparatus cast a shadow further contributing to the non-uniformity of the light field. In addition, careful adjustment of the multiple light sources and other aids was necessary and several measurements of light intensity with a light meter were indispensable with each adjustment. All this was time consuming and added to the expense of the photography operation. The equipment costs were also considerable.

In other photographic applications, it is often desirable to take a picture of an object against a different background. In photographic studios, this can be achieved by having a painted background depicting the image or design desired or a screen on which the background can be projected, and placing the subject to be photographed against this background in front of the screen. If a projector is used, the projector projecting the image of the background on the screen is usually located behind the screen (although it could also be located in front of the screen, but that requires use of expensive additional equipment). The projector is of course equipped with a light source.

In front of the screen, more than one light source is necessary to illuminate the subject in the foreground. The same types of problems with regulating the intensity and uniformity of the light are present here. In addition, this operation also requires expensive equipment (the screen or backdrop must be of sufficient size to accommodate the subject in the foreground, etc.) and substantial time in preparation of the photographic session.

OBJECTS OF THE INVENTION

One object of the present invention is to provide an apparatus and method for photographing objects under a uniform light field.

Another object is to provide an apparatus and method for photographing subjects under a substantially uniform light field needing only one piece of equipment and one light source for illuminating the subject.

Another object of the invention is to provide an apparatus and method for the foregoing purposes that permits controlling the wave length of colored light cast on selected parts of the subject to be photographed.

Another object is to provide an apparatus and method for taking superimposed pictures on two or more exposures of a still frame of film, which can be regular roll film.

Another object is to provide an apparatus and method for creating multiple exposure photographs permitting convenient and inexpensive control of one or more of the degree of exposure, the width and centering of the "vignette", the "saturation" color of each element of the composition and the focusing thereof.

Another object is to provide an apparatus and method for obtaining realistic photographs of a subject against a selected image as background without needing to use expensive cumbersome equipment and multiple light sources.

Another object is to provide an apparatus for accomplishing the foregoing objects that is in one piece so that together with a camera and one light source it is the only item of equipment necessary.

Another object is to provide an apparatus to accomplishing the foregoing purposes that is convenient to assemble and to store and convenient to build in any scale ranging from one suitable for photographing microscopic objects to one suitable for life-size photography. Preferably, the apparatus will be portable and/or collapsible.

Another object is to provide an apparatus and method for photographing three-dimensional as well as flat subjects (such as documents) under the conditions and achieving the goals outlined above.

Another object is to provide an apparatus for accomplishing the foregoing goals that permits convenient positioning and adjustment of a camera without the use of cumbersome accessories such as a tripod.

Another object is to provide an apparatus as outlined above affording flexibility in focusing the camera, adjusting the focus distance and camera angle.

Another object is to provide superimposed photographs of one or more subjects against a different background by successive exposures of the same frame (still) of negative film, which can be standard film.

Another object is to provide greeting cards, business cards, identification cards (and the like) made by use of the foregoing superimposing techniques and depicting one or more subjects superimposed on a background.

These and other objects of the present invention will become apparent to one of ordinary skill in the field in light of the following description drawings and claims.

SUMMARY OF THE INVENTION

One aspect of the present invention relates to an apparatus for use in taking photographs comprising:

a housing having a front face and a back face which are spaced from each other; said front face comprising a plate where the subject to be photographed is to be located; said plate having inner and outer surfaces; said back face having an opening through which the subject can be photographed with a camera;

a plurality of reflectors located outside the space between said opening and said plate, each of each reflectors being positioned such that it can receive light from a light source located at a point remote from the front of said housing and reflect said light across the inner surface of said plate and such that the density of the light reflected on said plate surface by said reflectors is substantially uniform across said plate.

Another aspect of the invention relates to a process a method for making superimposed photographs comprising a background and a foreground the method comprising:

exposing a selected portion of the negative with an image of said foreground by shielding from exposure the remainder of said negative with a mask;

centering a second mask over at least a substantial portion of said foreground image thereby preventing reexposure thereof; and exposing the unmasked portion of said negative with the image of said background.

BRIEF DESCRIPTION OF THE DRAWING

FIG. 1A is an axonometric view of the apparatus according to the present invention viewed from the front corner.

FIG. 2 is a side sectional view of the apparatus of the present invention.

DETAILED DESCRIPTION OF THE INVENTION

Figure 1B:
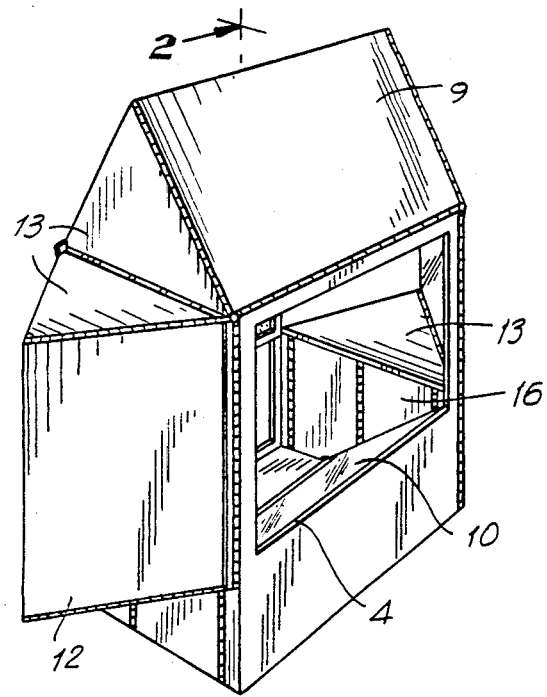
FIG. 1B is a perspective drawing of the same apparatus viewed from the rear corner.
Figure 3:
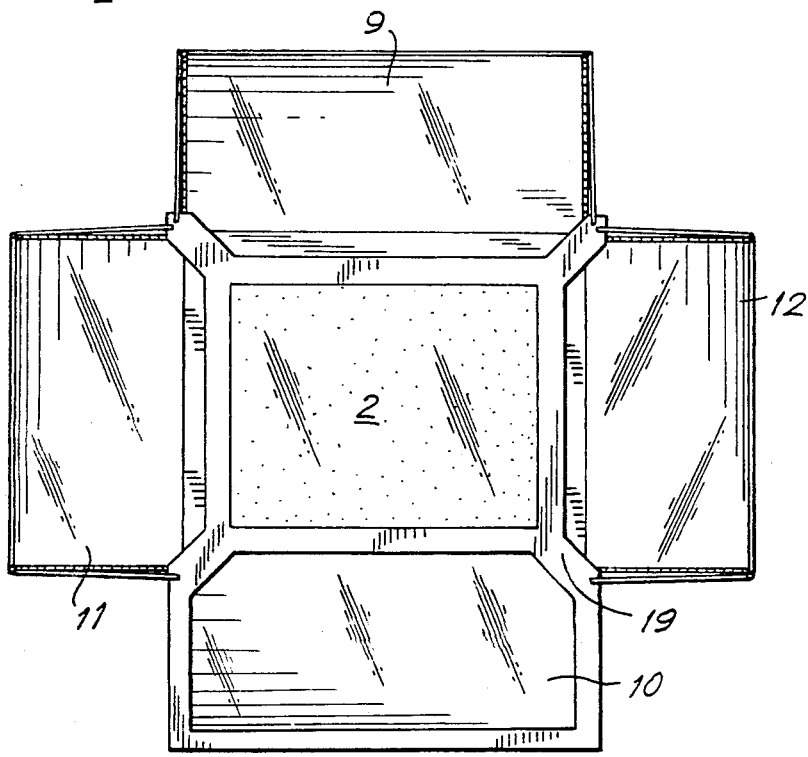
FIG. 3 is a front view of the apparatus of the present invention.

According to a preferred embodiment, and with reference to FIGS. 1-5, the apparatus for use in the present invention comprises a hollow housing 1 of generally rectilinear shape. The housing has a frame 19 and a base 17. The front face of the housing is essentially occupied by a plate 2 for resting the subject to be photographed.

The plate 2 is preferably also rectilinear in shape, but can be in any shape desired and is preferably made of a translucent material such as translucent glass or plastic. Acrylic translucent materials, such as #2447 or #7328 (standard numbers regardless of manufacturer) are available from plastic and glass forming companies and are particularly preferred. Provision of the translucent material permits the plate to be used as a projection screen for images projected from points forward of the plate as shown in FIG. 1 (outside the apparatus).

The rear face 3 of the housing has an aperture 4 of a magnitude relative to the size of the plate 2 such that the plate 2 would prevent light coming from a light source (located forward of Plate 2 and outside the housing) from directly reaching any point of the aperture 4. The purpose for this is to avoid direct impingement of light from a light source on the camera, as will be explained below. Of course, aperture 4 can be smaller than plate 2, but it is generally preferable to have the aperture 4 be as large as possible in order to afford the photographer the most convenience and freedom of movement, subject to avoidance of direct illumination explained above. The aperture serves also other purposes: for example, it is possible to shine a small light through the aperture on the plate for purposes of focusing the camera on the subject (alternatively, a second small aperture can be provided below the aperture, but in that case the bottom reflector 10 would also have to have a similar aperture).

The side faces of the housing 5 and 6 and the top face 7, are open and provided with three reflectors 9, 11 and 12. The base 17 contains bottom reflector 10. The front face which bears plate 2 has openings or cut-away portions 18 to permit light from the light source to impinge on the entire reflective surface of the four reflectors. The four reflectors 9, 10, 11 and 12 are disposed at an angle (a or b) to the plane of the rear face 3 of the housing containing the aperture 4. This angle is predetermined and varies according to the depth and size of the housing. The angles (b) of the two side reflectors 11 and 12 are opposite and equal and so are the angles (a) of the top and bottom reflectors 9 and 10. These angles are also determined by the dimensions of the plate. For example, if the plate is square, all angles a and b will be equal. If the horizontal sides of the plate are longer than the vertical sides of the plate, the angles b of the side reflectors (with respect to the rear face 3 of the housing would be closer to 180° than the angles a of the top and bottom reflectors. The objective is to have each of a pair of opposing reflectors contribute a portion of the light that falls onto the interior of the plate so that the sum of the light density at a given point on the interior of the plate is substantially the same everywhere on the plate. Empirical adjustment of the reflector positions, can be easily accomplished for any size plate.

Thus, the reflectors should be large enough so that in combination they illuminate the plate (more precisely, the area of interest on the plate) with substantially uniform light density. The reflectors may of course be larger than this, but it is not required.

With particular reference to FIGS. 1A, 1B and 2, the light from the light source will impinge on, for example, the top reflector 9 and will be reflected onto the inner surface of plate 2. The top of the plate, which is located close to the reflector 9 will receive the most light from this reflector. The bottom of the plate will receive relatively little light from the top reflector 9. However, the bottom reflector will compensate so that the total light intensity at the top (and at any point on a line from top to bottom) will be essentially the same as the light intensity at the bottom. The mutual compensation of the two side reflectors 11 and 12 operates in a similar manner from right to left and from left to right on the plate 2.

Figure 5:
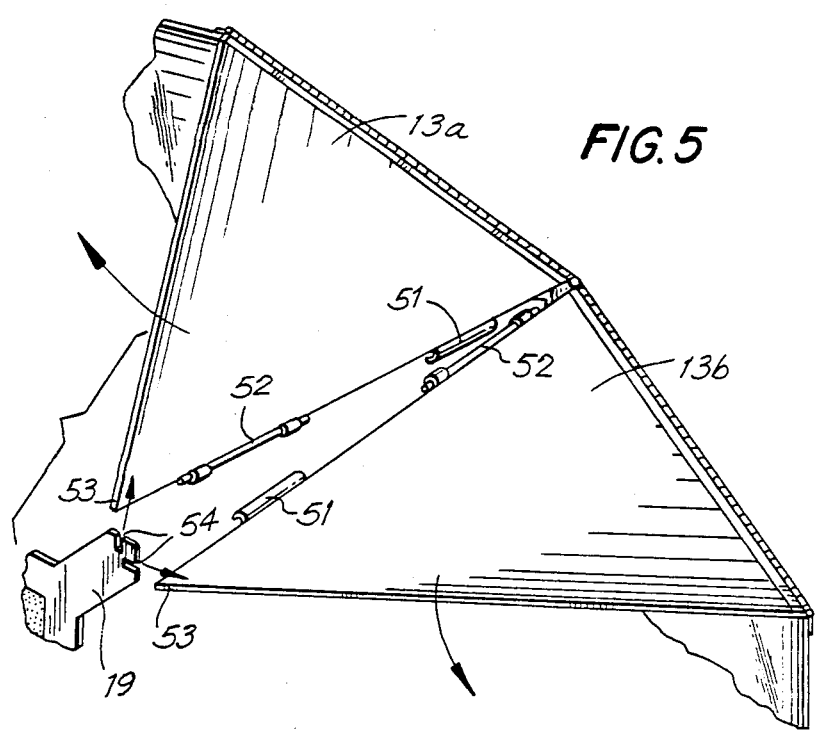
FIG. 5 is a detail of the apparatus of the present invention showing the engagement of adjacent reflector supports in said apparatus.

It will be appreciated that both the angles a are greater than 90° and less than 180° with respect to the plane of the rear face 3 and the angles b are also greater than 90° but less than 180°. The reflectors 9, 10, 11, and 12 are supported by triangular supports 13. Each of supports 13 of a reflector is attached to the adjacent support of the neighboring reflector as shown in FIG. 5. The angle of the planes of two adjacent supports 13 is substantially a right angle. Each reflector has two supports 13 except for the bottom reflector 10, which does not need to have two side supports (although it could) because it can rest against the base of the apparatus. In the particular (collapsible) embodiment depicted in the figures, reflector 10 has one support 14 which is a web resting flat on the base and against the front edge of the base 8 and thus supporting the reflector at the requisite angle a. Support 14 can be folded against reflector 10 along the bottom edge of reflector 10. The height of the base 17 of the housing is sufficient to accommodate the angle a and the height h of the bottom reflector 10.

Figure 6:
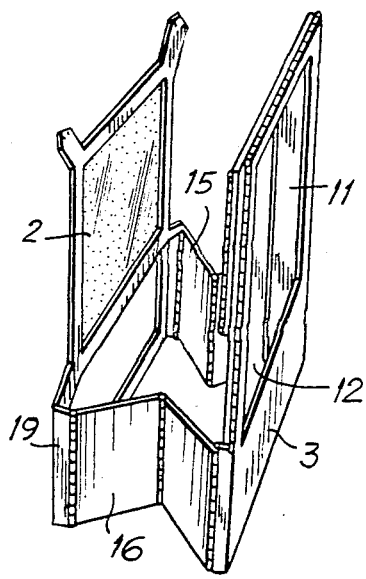
FIG. 6 is a perspective view of the apparatus in partially collapsed position.

In the particular embodiment described in detail herein, the apparatus is collapsible and can be folded flat. To achieve this, each of reflector supports 13 is releasably attached to its adjacent supports and can be folded inwardly, i.e., along the edge of the reflector and in a direction perpendicular to said edge. Thus, each pair of supports 13 can be folded against the reflective face of the reflector they support. The side elements 15 and 16 of the base are also collapsible (FIG. 6).

FIG. 5 shows two adjacent supports 13a and 13b of top and side reflectors 9 and 12 respectively. The supports can be connected by hooks 51 and eyes 52. The supports are also affixed at their free corner 53 to the frame of the housing (specifically the frame of plate 2) by being wedged in slots 54.

Figure 7:
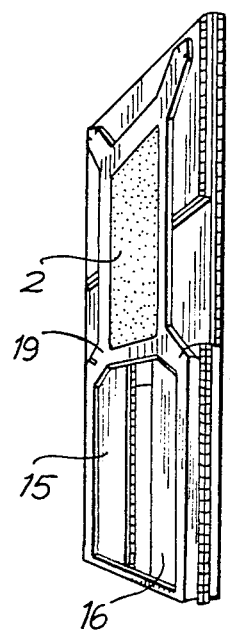
FIG. 7 is a perspective view of the apparatus in the collapsed position.

To collapse the apparatus, the respective supports 13 are unhooked and folded against reflectors 9, 11 and 12 (a piece of VELCRO ® —not shown — or other temporary attachment means may be used to hold the overlapping corners of folded supports in place). Then, the reflectors 11 and 12 are folded against the aperture-bearing plate, and secured with another similar VELCRO ® or other detachable and preferably reusable attachment means and reflector 9 is also collapsed and secured. Support 14 is released from the base and stretched out and together with reflector 10 is also folded upwards against face 3 so as to cover it. Then, side base frame elements 15 and 16 are collapsed as shown in FIG. 6 and the plate and aperture-bearing faces are collapsed against and fitted with each other, as shown in FIG. 7.

It will be appreciated that it is also possible to use only three reflectors but this will be at the sacrifice of substantially complete uniformity in light density on the plate. Nevertheless, three reflectors would be adequate for many of the purposes of the present invention. In any event, four reflectors are preferred particularly when photographing three dimensional objects.

The bottom portion of the chamber comprises a base 17 for resting the apparatus in the upright position. Base 17 is formed by the frame and walls of faces 3 and 3' and the collapsible elements 15 and 16. Base 17 is sufficiently high to accommodate the size and angle of reflector 10. Alternatively, the apparatus can be designed to be supported on a vertical surface such as a wall and attachment means such as hooks (not shown) can be provided on the aperture-bearing face 3. When the apparatus is thus attached to a vertical surface, the plate 2 would lie in a horizontal position. It is thus possible to conveniently rest objects to be photographed on the plate without need for any additional attachment or support means. The photographer could work from the aperture 4 which would be located parallel to and on top of the plate. Other arrangements of the apparatus are also possible requiring minimum or no additional accessories, as will be obvious to those skilled in the art. For example, the top reflector 9 can be folded (as if to close the apparatus) and the camera can be used through aperture 18 of a reflector 9 at an angle to the (3-dimensional) subject, if desired. Of course, the light will no longer be exactly uniform (but it will still be much closer to uniform than that achieved with prior art materials and procedures) but the nonuniformity of the light field also can be used to advantage as a special effect.

The plate may be made of a light-opaque material, but is preferably made of a translucent material as described above. However, if it is necessary to have an opaque plate, an attachment (which can be as simple as a piece of paper or cardboard) can be fitted on either the front or the rear surface of plate 2 to block light coming from the light source. Alternatively, the plate itself can be removable and replaceable by an opaque plate.

Figure 4:
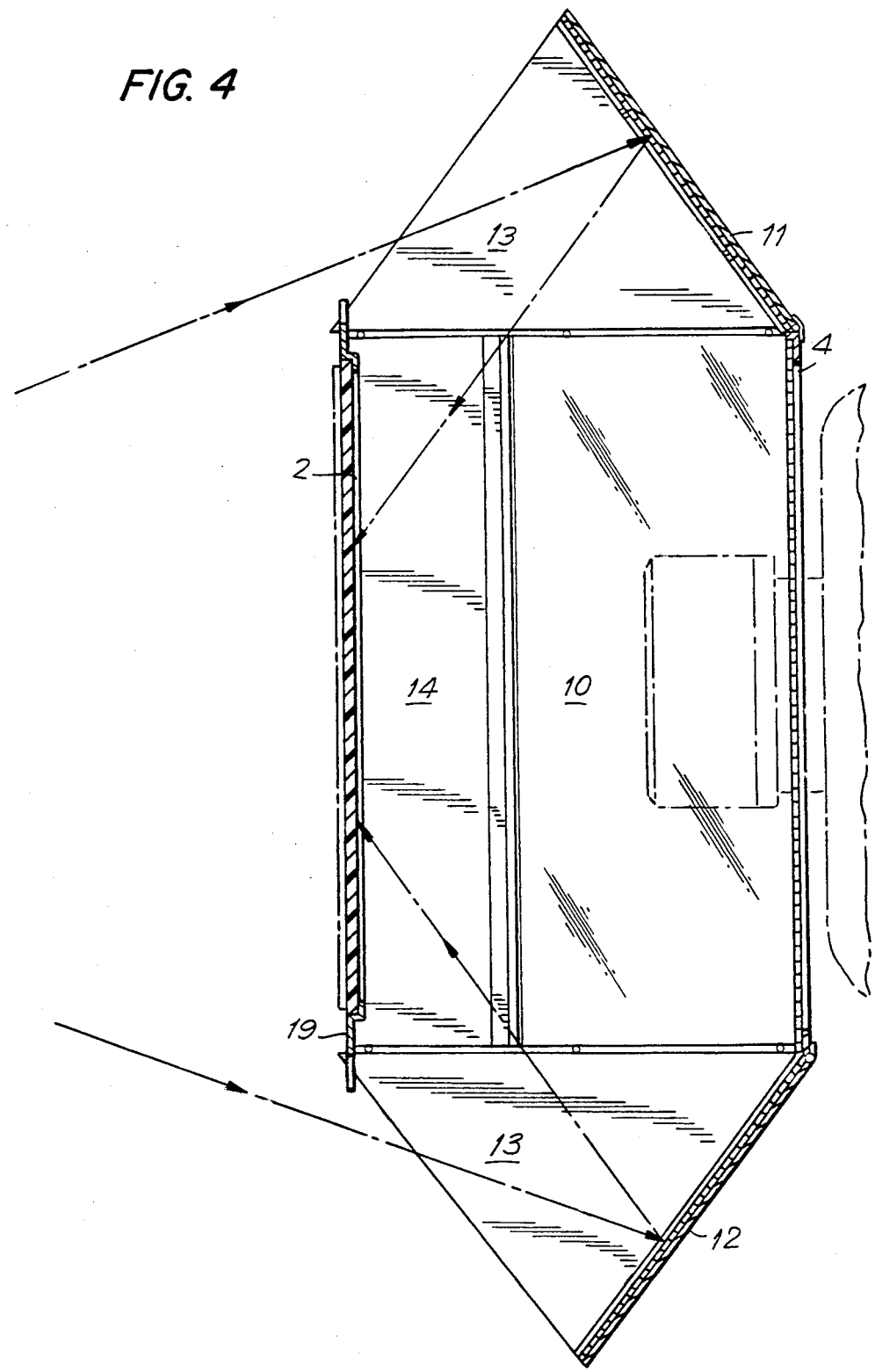
FIG. 4 is a top sectional view of the apparatus of the present invention.

The light source is positioned forward of the plate 2 as indicated by the schematic light rays in FIGS. 1A, 2 and 4 and can be itself direct or indirect. If the light source is indirect, the plate has to be opaque. If the light source is direct, the plate can be opaque or translucent depending on the use desired for the apparatus. The light reflected by the reflector within the interior of the apparatus will always be indirect. However, the reflectors themselves may receive either direct or indirect light.

Optionally, filters (not shown) can be fitted in front of one or more of the reflectors to achieve the desired apparent color mix for the subject to be photographed.

Typical filters are made of transparent colored cellophane as is well known in the art. Slits (not shown) or other supports can be provided in front of the reflectors for affixing different types of filters against the reflectors. Alternatively, one or more filters can be instead conveniently placed proximate to the light source and interposed between the light source and the reflectors. Other more sophisticated color mixing filters and arrangements are readily and advantageously usable in conjunction with the present method and apparatus, and add versatility to the uses of the apparatus.

The dimensions of the housing are not limited. However, the relative size of the different dimensions of the chamber is a function of the dimensions of the plate. For example, for a rectilinear plate measuring 25×31 cm, the base will measure 36×23 cm, the height (when the top reflector is 90° to the plane of the plate) measures 43 cm. When the apparatus is in the unfolded operating condition, the height from the top of the top reflector to the base is 60 cm. The width in the unfolded operating condition is 65 cm from the end of the left reflector to the end of the right reflector. The depth will be affected only when elements 16 are partially or totally collapsed. When completely collapsed, this particular exemplary embodiment of the present invention measures 43×36 cm ×1.5 cm deep, although the dimensions may vary slightly according to the thickness of the materials used to construct the apparatus.

Preferably, the present apparatus is made of metal, most preferably aluminum. Other materials of construction such as wood or plastic are possible. The reflective surfaces can be made of any grainy reflective surface, preferably aluminum. Most preferably, the apparatus except for the reflecting surfaces of the reflectors will be painted with flat black paint both in the exterior and the interior.

The operation of the apparatus varies according to the use desired.

For example, in order to take a picture of a subject without a background, the plate 2 should be opaque and the object should be placed against the plate. A light source (which can be a photography flash or a strobe light) is placed at a predetermined distance forward of the plate. The distance is predetermined in order to optimize the amount of light captured by the reflectors and reflected onto the subject to be photographed. The light can be direct or indirect (e.g., reflected off yet another reflecting surface which forms part of or is extrinsic to the apparatus before the light is captured by the reflectors of the apparatus; the additional reflecting surface should preferably be situated as to be parallel to the plane of the plate; alternatively, the light could be diffused by another such additional surface).

Indirect light results in the subject to be photographed being illuminated by a very soft light.

In any case, light captured by the reflector is directed to the plate 2 and illuminates the subject to be photographed. The arrangement of this apparatus results in light of substantially uniform light density on the plate and on the object.

The camera can be positioned within or without the housing as desired. In fact, it is one of the advantages particular to the present invention that the camera can be brought within the interior of the housing and approached to the subject to be photographed as closely as possible subject to the minimum focal length of the lens. The body of the photographer and of the camera does not obstruct the light reflected by the reflectors, since the light source and the reflectors are located in front of the photographer. This is in contrast to existing systems in which reflectors and lights are located behind the photographer and his equipment.

The present invention permits photographs of very small or very detailed objects to be taken especially of objects having uneven surfaces which are very difficult to illuminate uniformly. The quality of the prints obtained by use of this apparatus is equal to the best professional quality. For example, photographs may be taken of small objects such as electronic chips that may be desired to be photographed, or of other objects photographed, e.g., for advertising purposes. Electronic chips have engravings such as code numbers and detailed small structure that may be desired to be shown on the photograph. The present invention is particularly suitable for taking photographs of this type.

The objects that can be photographed using the present apparatus can be three-dimensional or two-dimensional. For example, photographs can be taken of documents, stamps or other flat surfaces such as old antique pictures that may contain great detail (which must be reproduced on the photograph) or scratches, folds or creases that must be faded on the reproduction. Under methods and using equipment of the prior art, it was very difficult to achieve a uniformly flat surface when taking such photographs. Imperfections, faults, or the uneven nature of a surface (for example, crepe or creased paper) diffuse or distort light falling thereon and result in an exaggerated uneven appearance to the camera lens. By having light of uniform density cast on the object, these problems are substantially reduced or eliminated. A vacuum table and other specialized equipment is not necessary.

If it is desired to take a picture of an object against a different background, the apparatus of the present invention can be advantageously used as follows. The light source used must for this purpose be direct and aimed at the rear surface of the plate, which must be translucent. An image can be projected onto the plate. For example, a transparency or a design can be projected on plate 2. A filter may also be projected on the plate in order to create special effects. For example, one or more color filters will result in the image projected on the plate or portions thereof having a particular color. The filter may be used against the plate, but preferably it will be a filter used proximate to the projector. The image can be made "darker" by using a filter that removes a portion of the light reaching the plate 2 from the front. It is thus possible to control the relative intensity between the background and the foreground object. Of course, if a single light source is used, the density of the background can only be made less than that of the foreground subject. But if a second light source is used for the projected image, then the background can be brighter than the foreground.

Figure 9:
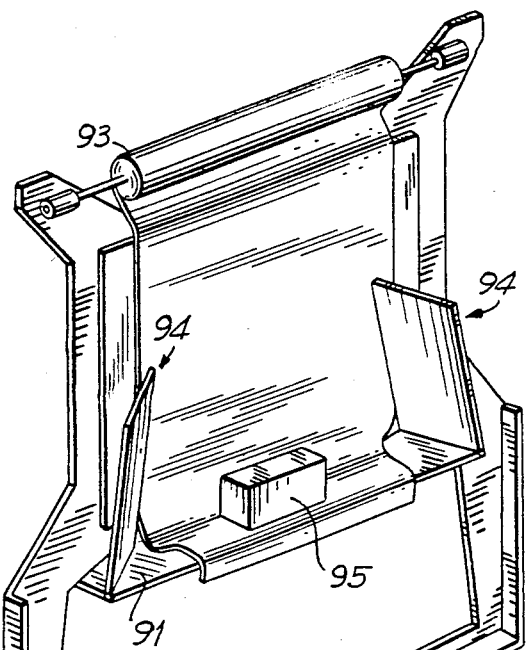
FIG. 9 shows a different embodiment of the apparatus of the present invention using a backdrop and fold out shelf.

Additional special effects can be created for example as follows: A shelf 91 can be provided at the bottom of the inside surface of the plate-bearing face of the apparatus, as shown in FIG. 9. The shelf can be folded closed when not needed. A backdrop 92 can also be provided that can be rolled onto a roller 93 horizontally disposed at the top of the plate-bearing face of the apparatus. The backdrop is dropped over the shelf as shown in FIG. 9 forming a curved 90° angle between the plate and the shelf. The 3-dimensional subject to be photographed is placed on the backdrop-covered shelf. The reflectors 9, 11 and 12 (which in this case are adjustable) are adjusted (preferably with the aid of a light meter) to such (sharper) angles as to make the light focus on the subject rather than the plate. Thus, the intensity of the image projected on the plate will not be faded by the reflected light, since the three reflectors are focusing on the subject sitting on the shelf.

The backdrop may be translucent or opaque as desired. Of course, it will be translucent if the background is a projected image.

The contrast between the background and the object can be enhanced by using color filters on the side reflector 9, 11 and 12 (this adds colored edges to the object and enhances its scope). The edges of the object can be made darker by placing two removable dark webs 94' and 95' just out of the range of the camera as shown in FIG. 9. This will darken the edges of the object on the photograph.

The reflector 10 on the bottom need not be adjustable. The shelf will prevent a portion of the light (reflected by reflector 10) from reaching the plate 2.

This arrangement permits a photograph of a foreground subject in a different background to be taken simultaneously using only a single piece of apparatus, an image for the background and a single light source and of course a single negative. A wide variety of backgrounds and foreground subjects can be selected. The size of the apparatus used will be determined to the size of the foreground subject.

The apparatus of the present invention can be adapted to be used for duplication of slides as follows:

The top and side reflectors 9, 11 and 12 are partially folded forward to be disposed at 90° to the plate 2. The apertures 18 are covered to prevent light from impinging on the bottom reflector. A "dark room" is thus created. The slide is placed onto the plate and in contact with it from the camera side. The plate must be translucent. The light source is placed outside the housing. The slide of interest is photographed by the camera which, through the aperture 4, "sees" the slide. The camera can be inserted inside the housing (depending on the size of the slide photographed).

The size of the slides that can be thus duplicated is limited only by the size of the plate. Different size slides can be duplicated using the same apparatus.

Prior art apparatus for duplicating slides was limited because only one size of slides could be processed in each type of apparatus.

Yet another application of the present invention is in making superimposed pictures. This is described by reference to FIG. 8 which is a schematic and illustrative drawing of the steps and equipment used to make superimposed photographs in accordance with the present invention using one negative film frame and ordinary film (in fact roll film use is possible).

First, the present apparatus may be used to take photographs of one or more particular backgrounds using a lens mask with an opaque portion corresponding to the particular location within the frame of the film where the image of the foreground subject will be placed.

Figure 8:
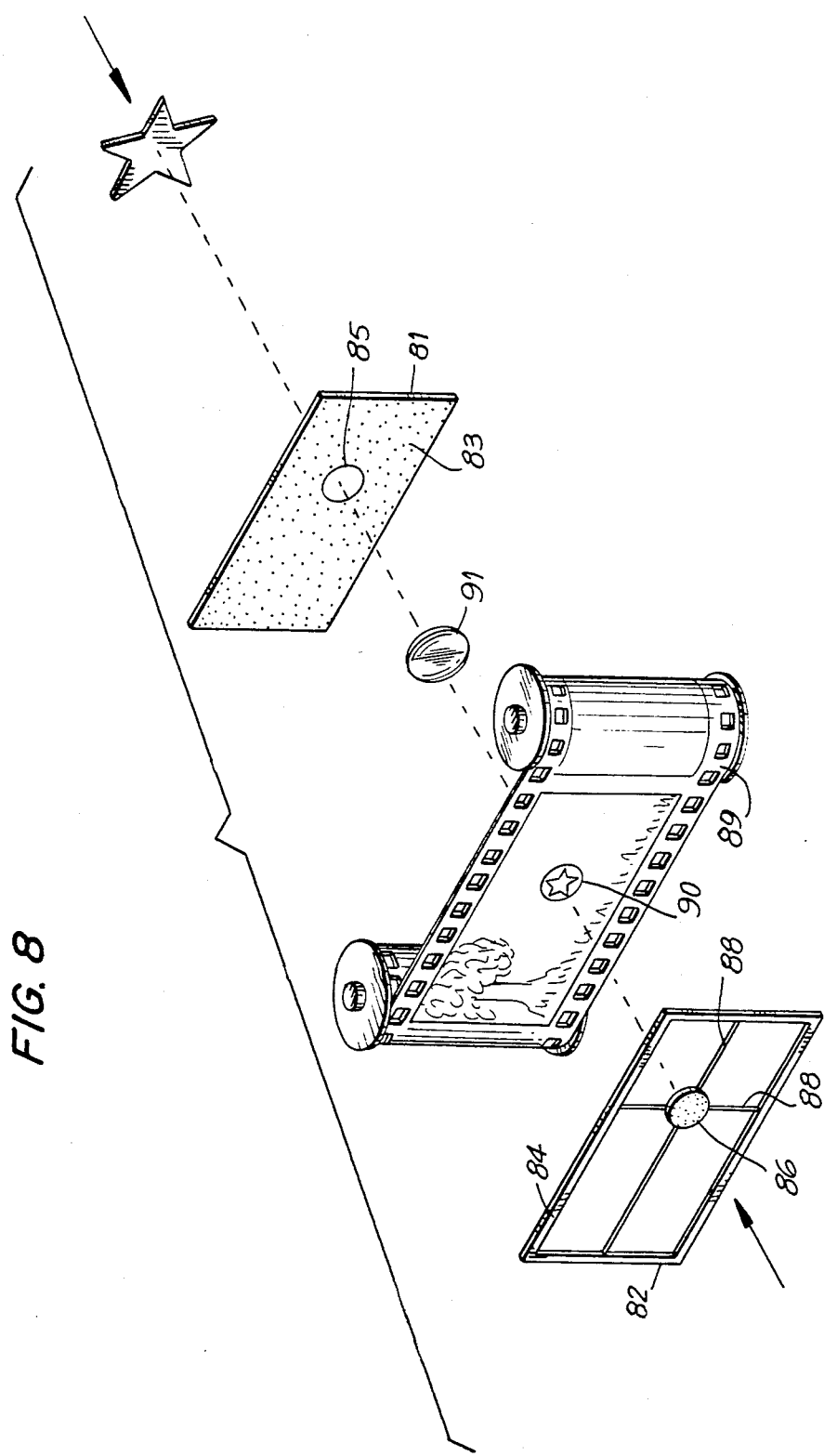
FIG. 8 is a schematic representation of superimposed photography on the same negative.

A most preferred mask combination is as follows (see FIG. 8). The first mask 81 consists of an opaque sheet 83 having an aperture 85 in the shape of the area to be blocked when taking a picture of the background. The second mask 82 consists of a rectangular frame 84 and of an opaque piece 86 corresponding exactly to the shape that is cut away from mask 81. The blocking piece 86 on mask 82 can be the very same piece that has been cut away from mask 81 to make the aperture 85. Piece 86 is held onto the frame 84 by virtue of thin wires 88, preferably very thin black wires. The position of piece 86 on the mask 82 relative to the film frame is fixed to be exactly the same as the position of the aperture 85 on mask 81. Mask 81 is used to mask the background when taking the picture of the foreground subject (illustrated by a star in FIG. 8) and mask 82 is used when taking the picture of the background (illustrated by a tree) to mask part of the background at the location of the foreground subject. The sequence of taking the foreground and background pictures is not important. The background can be photographed first or the foreground subject can be photographed first. Mask 82 has advantages over conventional masks. Conventional masks comprise a clear (transparent) portion consisting of cellophane, cellulosic, clear plastic or other transparent material. The blocking (opaque) portion (corresponding to piece 86 of the present invention) is affixed to the transparent sheet. Even though the sheet is transparent, however, it does absorb some light and changes the wavelength of the light. Furthermore, specks of dirt or grease marks or other obstructions on the transparent sheet may affect the color and the sharpness of the image "seen" by the camera lens.

In the mask 82 of the present invention, the wires 88 holding the opaque piece 86 at the specific location are out of focus relative to the camera and are invisible on exposure. The foreground subject can be then photographed using mask 81 that allows light to pass through only aperture 85. Nothing else is interposed between the background to be photographed and the camera lens.

It is possible to use ordinary film, even ordinary roll film, in taking the superimposed pictures in accordance with the present invention. No special cut film is required.

Figure 10:
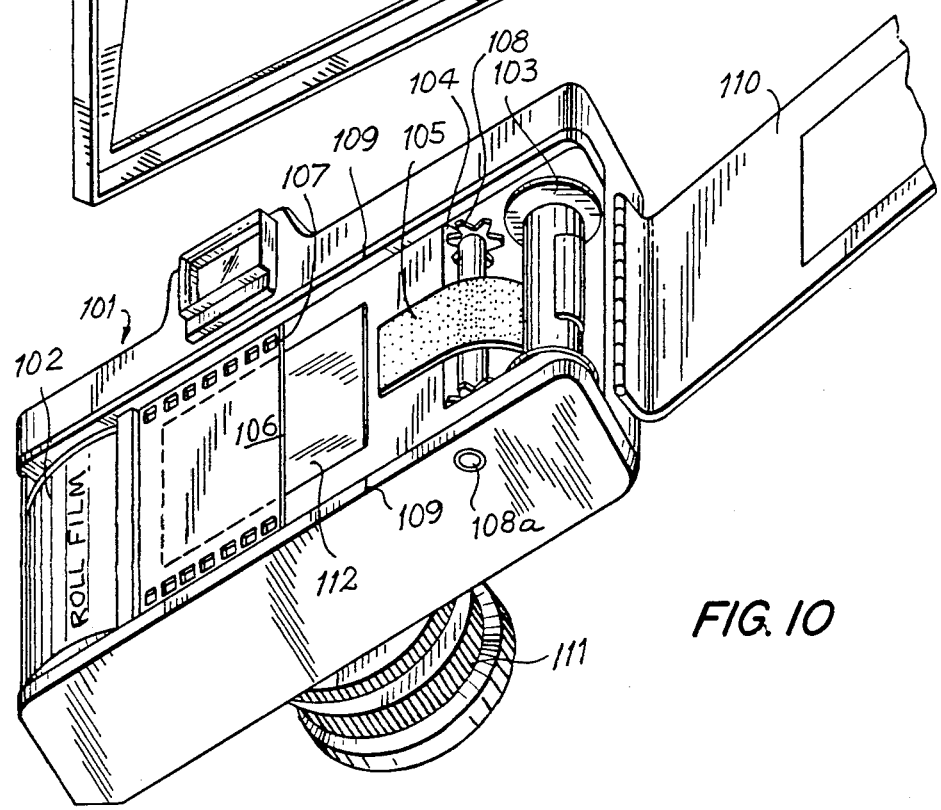
FIG. 10 is an illustration of a preferred method for loading the film in the camera prior to using the camera in accordance with the present invention.

The film is rewound after all the foregrounds (or backgrounds) are shot and then the backgrounds (or foregrounds) are shot by reemploying the same film. However, it is important to ensure that during the second shooting, the film frames will be exactly in the same position as during the first shooting. This can be assured by the following procedure (with reference to FIG. 10):

The (empty) camera 101 is placed lens-down on a table and the cover is opened. The (unused) film roll 102 is placed on the left magazine. A piece of adhesive tape 105 is inserted in the slot of the right-hand spool 103 (instead of the leader of the film). The sprocket is then wound one frame and the masking tape is wound around the spool 103 and extends over the sprocket 104 and to the left of the sprocket but it does not need to extend into the gate, as shown on FIG. 10. The adhesive side of the tape faces away from the camera. A length of film 106 is pulled out of the roll, is cut even with the full height of the film as shown in FIG. 10 and the film is caused to adhere on the tape with the first perforation 107 of the film is inserted into the top tooth 108 of the sprocket that is oriented upwards. The film is adhered to the adhesive tape by pressing it. The film is then wound as much as desired. This ensures that the film will not slip in relation to the sprocket 104 or spool 103. Thus, when the film is rewound (by releasing clutch 108 of sprocket 104) and already for the second shooting, the film will not be lost in the roll but will be able to be set again in exactly the same position. Care should be taken not to rewind the film so vigorously as to detach the film leader from the tape.

A mark, such as a thin line, 109 is engraved inside the camera onto the body of the camera (such that the mark can be used as a reference for the position of the roll film) and a corresponding line (not shown) is engraved on the film. The two lines form a reference corresponding to the "start" position of the film relative to the camera. The camera cover is then closed and the frames of the film are exposed once either by taking pictures of foreground subjects or by taking pictures of backgrounds. The film is rewound so that the mark on the film as rewound coincides with the mark on the camera thus fixing the position of the rewound film to be exactly the same as the original position when the film was first loaded on the camera. The film is then exposed a second time with the portion of the subject matter that was not taken the first time. The marking of the film permits the two parts of the superimposed picture to be exactly aligned. This is illustrated in FIG. 8 by showing the film roll 89 and showing exact alignment of the foreground star with the unexposed portion of the film (90) through the camera illustrated by the lens 91.

It is thus possible to shoot for example all the backgrounds first using the apparatus of the present invention and then with only the camera and the other portion of the mask shoot the foreground objects. This gives the operator great flexibility and freedom to shoot foreground objects in the field as opposed to the studio as was done in the prior art superimposed pictures. When using the apparatus of the present invention, there is no restriction as to the type of background that can be employed. It can be a slide, a photograph, a document, a printed picture, a greeting card and so on. The foreground object can be chosen to cater to the particular preferences of the consumer. The background can be exposed using the apparatus of the present invention and the result will be very realistic even if the background is a picture for example taken from a magazine. The uniform light afforded by the present invention is mainly responsible for this. In addition, the background can be photographed under exposure (aperture and time and depth of field) conditions that will match those of the exposure of the foreground. By controlling the size of the aperture of the foreground shot with that of the background shot, the width of the vignette can be controlled. By controlling the exposures (timing and aperture) of the foreground and the background the quality of the vignette (darker or lighter than the foreground or background) can be controlled.

Alternatively, the foreground can be photographed first in the field. The background can be then photographed using the present apparatus. The conditions of exposure of the foreground, can thus be precisely matched if desired. Alternatively, the conditions of exposure of the background can be made to bear another relationship to those of the foreground.

One particular application of the present invention would be in preparing personalized greeting cards, business cards and the like.

A common background can be exposed on one or more rolls of negative film. Different foreground objects, such as portraits of individuals, personalized inscriptions, and the like can be photographed on the unexposed (masked) portion of a negative before or after exposing the background on the same negative. Thus, the present invention affords a very economical and convenient system for achieving such cards and the like.

Another particular application can be in the making of business cards or identification cards. A plate or document or photograph, etc. bearing the name and/or logo of the company, state, or other institution can serve as the background, and a photograph of the I.D.- or business-cardholder and/or an inscription of his title or capacity and for additional information and insignia can be the foreground subject(s).

Another application of the present invention is in color separation for offset printing. The master photograph to be offset printed can be a composite superimposed photograph made by use of the present invention apparatus or any other photograph. If it is a superimposed composite photograph, it is prepared first in the exact configuration desired to be reproduced by offset printing. This is in contrast to prior art systems where all the elements of a composite photograph had to be color-separated before the composite was made up.

The color separation is effected all at once regardless of the complexity of the master. The master is placed (or projected) on plate 2. Color separation filters are used to separate each color and exposures of each color are made on black and white film for offset printing.

What is claimed is:

1. A method for making superimposed photographs on the same negative each of said photographs comprising a background and a foreground portion the method comprising:
   exposing a selected portion of the negative with an image of said foreground by shielding from exposure the remainder of said negative with a mask;
   centering a second mask over at least a substantial portion of said foreground image thereby preventing reexposure thereof;
   placing the subject of said background on a plate;
   indirectly lighting the subject of said background with a light field of substantially uniform density achieved from a single light source by first causing light from said source to impinge on a plurality of reflectors each disposed at a predetermined angle to said plate and employing reflected light from said reflectors to light said background; and
   exposing the unmasked portion of said negative with the image of said lit background.

2. The method of claim 1 further comprising controlling the degree of exposure of said background to bear a predetermined relationship to the degree of exposure of said foreground.

3. The method of claim 1 further comprising controlling the degree of exposure of said foreground to bear a predetermined relationship to the degree of exposure of said background.

4. The method of claim 1 wherein the subject of said background is selected from the group consisting of photographs, documents, projected images and previously superimposed images.

5. The method of claim 1 wherein the aperture for exposing said foreground bears a predetermined relationship to the aperture for exposing said background.

6. The method of claim 1 wherein said background is exposed on said negative after said negative contains an exposure of said foreground, the method further comprising using a second mask to shield said foreground from double exposure, said second mask consisting essentially of a frame and an opaque element centered to be in registry with said foreground image by means of thin wires, said second mask being mounted proximate to the camera lens employed for making said superimposed photograph.

7. The method of claim 1 wherein said foreground is photographed before said background.

8. A method for making superimposed photographs on the same negative frame of film, said photographs comprising a background and a foreground, the method comprising:
   (a) first exposing a selected portion of said negative frame with an image of one of said background and foreground by shielding from exposure the remainder of said negative frame with a mask;
   (b) positioning the subject of the other of said background and foreground on a plate; indirectly illuminating said plate with light of substantially uniform density from a single light source by directing light from said light source to a plurality of reflectors positioned at predetermined angles to the plane of said plate and impinging reflected light from said reflectors on said subject;
   (c) positioning a second mask in registry with at least a substantial portion of said first exposed image thereby preventing reexposure thereof; and
   (d) exposing the unmasked portion of said negative with the image of said subject.

9. The method of claim 8 further comprising also conducting step (a) in accordance with step (b).

10. A method for making superimposed photographs on the same frame of a roll of negative film, said photographs comprising a background and a foreground, the method comprising the following steps in sequence:
    (a) first exposing a selected portion of a first frame of negative film with an image of one of said foreground and said background by shielding from exposure the remainder of said first frame with a first mask;
    (b) making a series of first exposures by repeating step (a) advancing the film by one frame for each exposure;
    (c) rewinding said film to the first frame;
    (d) preventing reexposure of the exposed portion of said first frame by shielding said portion with a second mask;
    (e) second-exposing the previously unexposed portion of said first frame with an image of the other of said foreground and said background;
    (f) making a series of second exposures by repeating said step (e) advancing the film for each exposure.

11. The method of claim 10 further comprising indirectly lighting the subject of said background with a light field of substantially uniform density achieved from a single light source by first causing light from said light source to impinge on a plurality of reflectors each disposed at a predetermined angle to said plate and employing light reflected from said reflectors to light said background.

* * * * *